United States Patent [19]

Bolon

[11] Patent Number: 4,481,339

[45] Date of Patent: Nov. 6, 1984

[54] ACID-EXTENDED COPOLYAMIDEIMIDES AND METHOD FOR THEIR PREPARATION

[75] Inventor: Donald A. Bolon, Scotia, N.Y.

[73] Assignee: General Electric Company, Schenectady, N.Y.

[21] Appl. No.: 532,326

[22] Filed: Sep. 15, 1983

[51] Int. Cl.³ .............................................. C08G 73/14
[52] U.S. Cl. .................................... 525/424; 525/428; 525/432; 525/436; 528/26; 528/73; 528/74; 528/84; 528/185; 528/188; 528/352; 528/353
[58] Field of Search ................ 528/188, 353, 185, 26, 528/73, 74, 84, 352; 525/424, 428, 432, 436

[56] References Cited

U.S. PATENT DOCUMENTS

| | | | |
|---|---|---|---|
| 4,225,686 | 9/1980 | Onder et al. | 525/419 |
| 4,258,155 | 3/1981 | Holub et al. | 525/431 |
| 4,332,929 | 6/1982 | Holub et al. | 528/185 |

*Primary Examiner*—Lester L. Lee
*Attorney, Agent, or Firm*—William H. Pittman; James C. Davis, Jr.; James Magee, Jr.

[57] ABSTRACT

Polyamideimides are prepared by first reacting a diamine, preferably an aromatic diamine, with a carboxy anhydride such as trimellitic anhydride and a dianhydride such as bisphenol A dianhydride; and then reacting mixtures of the resulting prepolymers and dicarboxylic acid, or functional derivatives thereof, with a diisocyanate or diamine, preferably an aromatic diisocyanate.

19 Claims, No Drawings

ACID-EXTENDED COPOLYAMIDEIMIDES AND METHOD FOR THEIR PREPARATION

This invention relates to new polymeric compositions of matter and methods for their preparation.

Various polyamides and polyimides prepared by the reaction of polycarboxylic acids and their functional derivatives with polyamides and/or polyisocyanates are known in the art. For example, British published application No. 2,080,316 discloses the reaction of a mixture of one or more dianhydrides and a tribasic acid anhydride with a diamine, diisocyanate or mixture thereof to produce polymers containing both amide and imide linkages. Other reactions of diamines with polycarboxylic acid anhydrides are disclosed in U.S. Pat. No. 3,975,345. The reaction of diisocyanates with various combinations of dicarboxylic, tricarboxylic and tetracarboxylic acids and their anhydrides are disclosed in the following U.S. patents:
U.S. Pat. No. 3,843,587
U.S. Pat. No. 3,929,691
U.S. Pat. No. 4,061,622

According to U.S. Pat. No. 4,331,799, polymers containing both amide and imide moieties can be prepared by reacting diamines with a mixture of a dianhydride and the acyl chloride of a carboxy anhydride, such as trimellitic anhydride.

This reaction and the others disclosed as described above produce polymers of random and relatively uncontrollable structure and properties. Among the results may be high susceptibility to heat distortion and low glass transition temperature. Moreover, the use of an acyl chloride as a precursor may result in the presence of residual chloride in the polymer, an unacceptable situation for certain utilities (for example as electrical insulators).

Copending application Ser. No. 532,325, filed of even date herewith, disclosure of which is incorporated by reference herein, discloses and claims novel copolyamideimides free from many of these deficiencies, prepolymer intermediates therefor, and methods for their preparation. It remains of interest, however, to prepare copolyamideimides having such properties from relatively inexpensive starting materials.

A principal object of the present invention, therefore, is to provide novel copolyamideimides.

A further object is to provide copolyamideimides with relatively high glass transition temperatures and resistance to heat distortion.

A further object is to provide relatively simple methods for the preparation of copolyamideimides as described above.

Other objects will in part be obvious and will in part appear hereinafter.

In its broadest sense, the present invention is directed to acid-extended copolyamideimides prepared by a method which comprises the steps of:

(1) reacting, under conditions whereby all water of reaction is removed:

(A) at least one diamine having the formula $$H_2N-R^1-NH_2, \qquad (I)$$

wherein $R^1$ is a divalent hydrocarbon-based radical, with (B) at least one carboxy anhydride of the formula

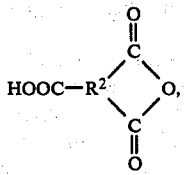

wherein $R^2$ is a trivalent hydrocarbon-based radical, and (C) at least one dianhydride of the formula

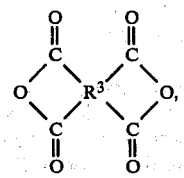

wherein $R^3$ is a tetravalent hydrocarbon-based radical;

the molar ratio of reagent C to reagent B being at least about 0.25:1 and the ratio of equivalents of reagent A to anhydride equivalents of reagents B and C combined being about 1:1; and subseqently (2) reacting a mixture of (D) the product of step 1, or a functional derivative thereof, and (F) at least one dicarboxylic acid having the formula $$HOOC-R^7-COOH, \qquad (IV)$$

or a functional derivative thereof, wherein $R^7$ is a divalent hydrocarbon-based radical containing about 3–12 carbon atoms, with (E) at least one of diisocyanates having the formula $$OCN-R^4-NCO \qquad (V)$$

and diamines having the formula $$R^5NH-R^4-NHR^6, \qquad (VI)$$

wherein $R^4$ is a divalent hydrocarbon-based or polymeric radical and each of $R^5$ and $R^6$ is independently hydrogen or a lower hydrocarbon-based radical.

As used herein, the term "hydrocarbon-based radical" denotes a radical free from acetylenic and usually also from ethylenic unsaturation, having a carbon atom directly attached to the remainder of the molecule and having predominantly hydrocarbon character within the context of this invention. Such radicals include the following:

(1) Hydrocarbon radicals; that is, aliphatic, alicyclic, aromatic, aliphatic- and alicyclic-substituted aromatic, aromatic-substituted aliphatic and alicyclic radicals, and the like. Such radicals are known to those skilled in the art; examples are methyl, ethyl, propyl, butyl, decyl, cyclopentyl, cyclohexyl, phenyl, tolyl, xylyl, α-naphthyl, β-naphthyl and biphenylyl (all isomers being included).

(2) Substituted hydrocarbon radicals; that is, radicals containing non-hydrocarbon substituents which, in the context of this invention, do not alter the predominantly hydrocarbon character of the radical. Those skilled in the art will be aware of suitable substituents; examples are halo, alkoxy (especially lower alkoxy), carbalkoxy, nitro, cyano and alkyl sulfone.

(3) Hetero radicals; that is, radicals which, while predominantly hydrocarbon in character within the context of this invention, contain atoms other than carbon present in a chain or ring otherwise composed of carbon atoms. Suitable hetero atoms will be apparent to those skilled in the art and include, for example, nitrogen, oxygen, sulfur and silicon.

For the most part, not more than three substituents or hetero atoms will be present for each 10 carbon atoms in the hydrocarbon-based radical. An exception comprises molecules in which silicon is a hetero atom, which may, for example, contain three hetero atoms for as few as 4 carbon atoms.

Reagent A according to this invention is at least one diamine having formula I. The $R^1$ value therein is most often an aromatic hydrocarbon radical containing about 6–20 carbon atoms or a halogenated derivative thereof, an alkylene or cycloalkylene radical containing about 2–20 carbon atoms or a bis-alkylenepoly(dialkylsiloxane) radical. The aromatic hydrocarbon radicals are preferred.

Examples of suitable diamines of formula I are ethylenediamine, propylenediamine, trimethylenediamine, diethylenetriamine, triethylenetetramine, heptamethylenediamine, octamethylenediamine, 2,11-dodecanediamine, 1,12-octadecanediamine, 3-methylheptamethylenediamine, 4,4-dimethylheptamethylenediamine, 5-methylnonamethylenediamine, 2,5-dimethylhexamethylenediamine, 2,2-dimethylpropylenediamine, N-methyl-bis(3-aminopropyl)amine, 3-methoxyhexamethylenediamine, 1,2-bis(3-aminopropoxy)ethane, bis(3-aminopropyl) sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, benzidine, 3,3'-dimethyl-benzidine, 3,3'-dimethoxybenzidine, 1,6-diaminonaphthalene, 4,4'-diaminodiphenylmethane, 4,4'-diaminodiphenylpropane, 2,4-bis-($\beta$-amino-t-butyl)toluene, bis(p-$\beta$-methyl-o-aminopentyl)-benzene, 1,3-diamino-4-isopropylbenzene, 4,4-diaminodiphenyl sulfone, 4,4'-diaminodiphenyl ether and bis(3-aminopropyl) tetramethyldisiloxane. Mixtures of these diamines may also be used. Particularly preferred are the aromatic diamines, especially m-phenylenediamine and 4,4'-diaminodiphenylmethane; the $R^1$ radical is then either

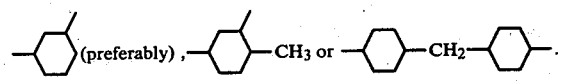

In reagent B (the carboxy anhydride) as defined by formula II, $R^2$ is usually a trivalent aliphatic radical containing about 2–20 carbon atoms or, preferably, a trivalent aromatic radical containing about 6–20 carbon atoms. Illustrative carboxy anhydrides are trimellitic anhydride, 5-chlorotrimellitic anhydride, benzene-1,2,3-tricarboxylic acid anhydride and carboxysuccinic anhydride. The preferred carboxy anhydrides are those in which $R^2$ is an aromatic and especially an aromatic hydrocarbon radical. Trimellitic anhydride is most preferred.

In reagent C (the dianhydride) as defined by formula III, $R^3$ is a tetravalent radical which is typically analogous to those previously described with reference to $R^1$ and $R^2$. A number of suitable dianhydrides are disclosed in columns 5–6 of U.S. Pat. No. 4,061,622 and in U.S. Pat. No. 4,331,799. The disclosures of both of said patents are incorporated by reference herein.

A particularly preferred group of dianhydrides of formula III comprises those in which $R^3$ is

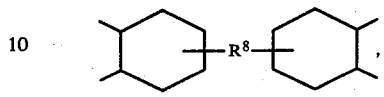

wherein $R^8$ is oxygen, sulfur, —$SO_2$—, lower alkylene (the word "lower" as used herein denoting up to 7 carbon atoms) or, most desirably, —O—$R^9$—O— and $R^9$ is a divalent aromatic hydrocarbon-based radical. $R^9$ is most often a divalent radical derived from benzene or a substituted benzene, biphenyl or a substituted biphenyl, or a diphenylalkane which may contain substituents on one or both aromatic radicals. The following radicals are preferred as $R^9$:

(VII)

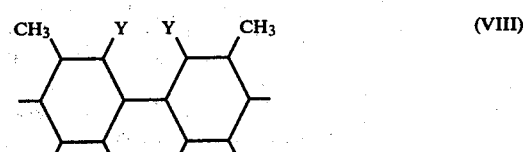

(VIII)

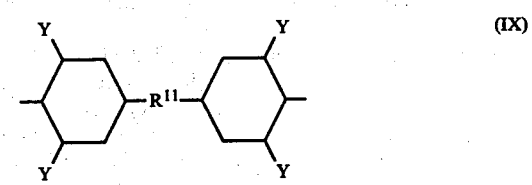

(IX)

wherein each $R^{10}$ is independently hydrogen or methyl, $R^{11}$ is a straight-chain or branched alkylene radical containing 1–5 carbon atoms and is most often the isopropylidene radical, and each Y is independently hydrogen or halogen (usually chlorine or bromine). Mixtures of the foregoing formulas are also contemplated. Most preferred is the radical derived from bisphenol A [i.e., 2,2'-bis(4-hydroxyphenyl)propane] by the removal of both hydroxy groups therefrom, and having formula IX wherein $R^{11}$ is isopropylidene and each Y is hydrogen. Thus, the most preferred dianhydride for use as reagent C is 2,2-bis[4-(3,4-dicarboxyphenoxy)phenyl]propane dianhydride, hereinafter referred to as "bisphenol A dianhydride".

Step 1 in the method of this invention is ordinarily effected by merely blending reagents A, B and C and heating to a temperature at which said reaction takes place. The reaction with the two anhydrides may be simultaneous (i.e., reagents B and C used together) or sequential (i.e., reagent C added first, followed by reagent B); however, simultaneous reaction is usually preferred since no particular advantage results from sequential addition.

The reaction temperature is typically within the range of about 100°–200° C., and at least partially above about 160° C. to insure removal of all water of reaction and complete imidization of any amic acids formed. It is usually advantageous to carry out the reaction in a substantially inert organic diluent. Typical diluents are such aprotic solvents as benzene, toluene, xylene, o-dichlorobenzene, dimethylformamide, dimethylacetamide, dimethyl sulfoxide or N-methylpyrrolidone.

A factor in step 1 is the difference in reactivity with reagent A of intramolecular anhydride and carboxylic acid moieties. The reaction of a diamine with intramolecular anhydride moieties is strongly favored over that with carboxylic acid moieties. This selectivity insures production of a carboxy-terminated prepolymer.

It is frequently preferred to include in the reaction mixture a catalytic amount of at least one tertiary amine, which may be aliphatic, alicyclic or heterocyclic. Suitable amines include triethylamine, N-methylpiperidine and 4-dimethylaminopyridine. The required amount of tertiary amine is small, typically about 0.05–0.5% by weight based on the total of reagents A, B and C.

The molecular weight of the prepolymer intermediate produced in step 1 will depend to a large extent on the molecular ratio of reagent C to reagent B in the reaction mixture, with higher molecular weight prepolymers being obtained as the proportion of reagent C is increased. Molar ratios of at least about 0.25:1 are within the scope of the invention. A ratio of at least 0.5:1 is preferred, since lower ratios will produce a prepolymer in which some molecular species contain moieties derived from reagents A and B only. There does not appear to be any upper limit to this molar ratio, although a higher value than about 5:1 usually affords no particular advantage.

The proportion of reagent A in the reaction mixture is determined so as to produce a carboxy-terminated prepolymer. This is effected by using a ratio of equivalents of reagent A to anhydride equivalents of reagents B and C combined of about 1:1, typically about 0.95–1.05:1. The term "anhydride equivalent" as used herein is based on the number of anhydride groups theoretically present per molecule, with free carboxylic acid groups being disregarded; thus, one mole of reagents B and C is one and two anhydride equivalents, respectively. One mole of reagent A is two equivalents thereof, since two amino groups are present per molecule. Under these conditions, only the anhydride groups react with reagent A and the free carboxy groups become the terminal groups in the prepolymer.

Structural evidence indicates that the prepolymer intermediates produced in step 1 have the formula The preparation of prepolymers by step 1 of the method of this invention is illustrated by the following examples. All parts are by weight.

EXAMPLES 1–6

A mixture of 19.2 grams (0.1 mole) of trimellitic anhydride (reagent B), bisphenol A dianhydride (reagent C), a stoichiometric amount of m-phenylenediamine (MPD) or 4,4'-diaminodiphenylmethane (MDA) (reagent A) with respect to anhydride equivalents of reagents B and C, 0.01 part of 4-dimethylaminopyridine, 30 parts of N-methylpyrrolidone and 47 parts of toluene was slowly heated to 130° C., during which time the mixture became homogeneous and a toluene-water azeotrope began to distill. Heating was continued to approximately 180° C. as water was removed by distillation. The residue was a solution of the desired prepolymer.

The reagents, proportions and other pertinent data for Examples 1–6 are given in Table I.

TABLE I

| Example | Amine | Mole ratio, C:B |
|---------|-------|-----------------|
| 1 | MPD | 0.5 |
| 2 | MPD | 0.25 |
| 3 | MPD | 1.0 |
| 4 | MDA | 0.5 |
| 5 | MDA | 1.0 |
| 6 | MDA | 1.5 |

For the formation of the acid-extended polyamideimides of the invention (step 2), a mixture of the product of step 1 or a functional derivative thereof (reagent D) and reagent F (described hereinafter) is reacted with reagent E which may be a diisocyanate or a diamine. If reagent D is the prepolymer itself, the reaction forming the polyamideimide proceeds most effectively when reagent E is a diisocyanate, and involves the condensation of one carboxylic acid moiety with one isocyanate moiety to form an amide linkage with the elimination of one mole of carbon dioxide. A corresponding carboxylic acid-amine reaction is somewhat slow and difficult, so if reagent E is a diamine it is preferred to use as reagent D a functional derivative of the prepolymer such as an acyl halide thereof. For electrical uses of the polyamideimides, however, where the presence of halide ions may be detrimental, and also for the sake of simplicity of production, the reaction between the prepolymer and the diisocyanate is preferred. Frequent reference hereinafter will be made to diisocyanates as reagent E, but it should be understood that diamines may be substituted therefor under appropriate conditions.

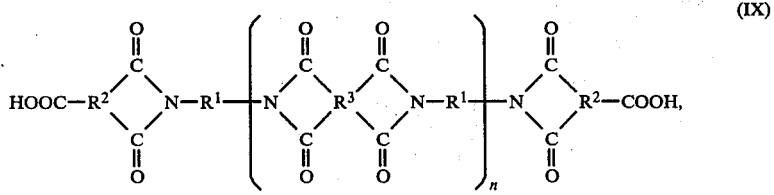
(IX)

wherein $R^{1-3}$ are as previously defined.

In formula IX, the value of n will theoretically be twice the molar ratio of component C to component B. As said molar ratio varies from 0.25:1 to 5:1, therefore, the average value of n will vary from 0.5 to 10 and is preferably at least 1.

The diisocyanates and diamines suitable for use as reagent E have formulas V and VI, respectively. In these formulas, $R^4$ may be a divalent hydrocarbon radical similar to $R^1$ in formula I. It may be the same as $R^1$ or different. When reagent D is a diamine, each of $R^5$ and R⁶ may be hydrogen or a lower hydrocarbon-based radical, preferably a hydrocarbon radical and still more preferably a lower alkyl (especially methyl). When R⁵ or R⁶ is other than hydrogen, the reaction thereof with the acid moiety in the prepolymer will form an N-substituted amide linkage. Such linkages are, of course, not formed when reagent E is a diisocyanate.

Illustrative diamines suitable for use as reagent E include those recited hereinabove with reference to reagent A, as well as, for example, the corresponding N,N'-dimethyl compounds. Illustrative diisocyanates are p-phenylene diisocyanate, 2,4-toluene diisocyanate, 2,6-toluene diisocyanate, xylene diisocyanates, mesitylene diisocyanate, durene diisocyanate, 4-methoxy-1,3-phenylene diisocyanate, 4-chloro-1,3-phenylene diisocyanate, 4-isopropyl-1,3-phenylene diisocyanate, the tolidine diisocyanates, dianisidine diisocyanate, 4,4'-methylenebis(phenyl isocyanate), 4,4'-methylenebis(o-tolyl isocyanate), 4,4'-methylenebis(cyclohexylisocyanate), 1,5-naphthalene diisocyanate, 4,4'-bis(isocyanatophenyl) ether, 2,4'-bis(isocyanatophenyl) ether, and 4,4'-bis(isocyanatophenyl) sulfone. Mixtures of the foregoing isocyanates are also contemplated. The preferred diisocyanates, from the standpoint of availability, low cost and particular suitability for preparing the polyamideimides of this invention, are 2,4-toluene diisocyanate (2,4-TDI), 2,6-toluene diisocyanate (2,6-TDI), and 4,4'-methylenebis(phenyl isocyanate) (MDI).

Reagent E may also be an isocyanate- or amine-terminated polymer, such as a polyamide or polyurethane. In that case, R⁴ is a polymeric radical and the product is a block copolymer with polyimide and polyamide, polyurethane or similar blocks connected by amide linkages.

As previously mentioned, step 2 of the method of this invention is the reaction of a mixture of reagents D and F with reagent E. Reagent F is at least one dicarboxylic acid having formula IV, or a functional derivative thereof; whether the free acid or a derivative thereof is used will depend on the structure of reagent D, the same functional groups being present in reagents D and F. The R⁷ avalue in formula IV is a divalent hydrocarbon-based radical containing about 3-12 carbon atoms such as trimethylene, tetramethylene, hexamethylene, decamethylene, m-phenylene, p-phenylene, p-tolylene, p-chlorophenylene or 1,4-naphthylene. Alkylene radicals containing 3-6 carbon atoms and aromatic hydrocarbon radicals, especially the latter, are preferred. Most preferably, R⁷ is at least one of the m- and p-phenylene radicals.

In step 2, a mixture of reagents D, E and F is normally heated to a temperature within the range of about 150°–225° C. until carbon dioxide evolution is complete. The reaction may be effected in a substantially inert organic diluent such as those previously listed with reference to prepolymer formation.

In general, molar ratios of reagent F to reagent D may be as high as 2:1 but are preferably up to about 1.5:1. There is no real lower limit for said ratio, but a value less than about 0.1:1 rarely offers any advantage. The most preferred values are from about 0.4:1 to about 1.25:1.

The ratio of equivalents of reagents D and F combined to reagent E (the equivalent weight of each being half its molecular weight) may be varied in accordance with the polymer molecular weight desired. In general, ratios between about 0.5:1 and about 2:1 are contemplated, these being the minimum and maximum values which will produce a product containing at least two prepolymer-, acid- or diisocyanate-derived units. Ratios from about 0.67:1 to about 1.5:1 are preferred since products of higher molecular weight are then obtained. The most preferred ratio is about 1:1. Because the reaction between reagents D, E and F normally does not proceed to completion, it is frequently advisable to analyze the reaction mixture for free acid groups after the initial reaction with reagent E, and subsequently to add an additional increment thereof effective to reduce the residual acid content to less than about 1%. Most often, no more than about 10% by weight of the original amount of reagent E is required for this purpose. Thus, a ratio of equivalents of reagents D and F combined to reagent E between about 0.9:1 and about 1:1 is especially preferred. It is also contemplated to incorporate in the reaction mixture minor amounts of chain-stopping or end-capping reagents, typically monoisocyanates such as phenyl isocyanate, monoamines such as aniline, monocarboxylic acids such as benzoic acid or monoanhydrides such as phthalic anhydride.

It is believed that the copolyamideimides of this invention consist essentially of units having the formula

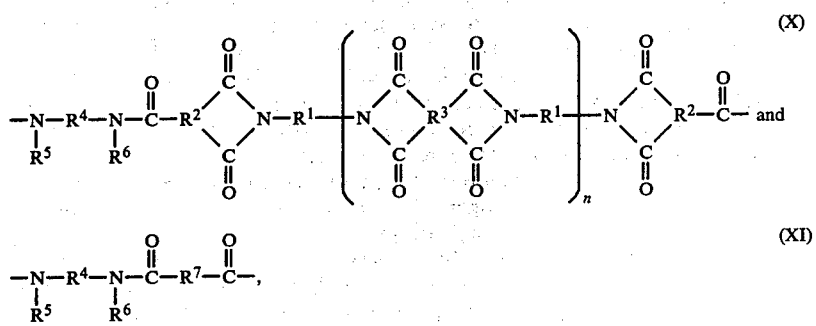

wherein R¹⁻⁷ and n are as previously defined, the ratio of units of formula XI to those of formula X being approximately the same as the molar ratio of reagent F to reagent D. Because of some uncertainty regarding this structure, however, they are also appropriately defined in terms of the method for their preparation.

The copolyamideimides of this invention normally have weight average molecular weights from about 30,000 to about 150,000. The intrinsic viscosities thereof, determined in dimethylformamide at 25° C., are in the range of about 0.2–0.9 dl./g.

The preparation of acid-extended copolyamideimides by step 2 of the method of this invention is illustrated by the following examples.

EXAMPLES 7-9

To 0.1 equivalent of the prepolymer of Example 1 was added a measured amount of dicarboxylic acid. After all toluene was removed by distillation, the temperature of the mixture was raised to 150°-190° C. and a solution of an equivalent amount of 2,4-toluene diisocyanate in 50 ml. of o-dichlorobenzene was added over 1 hour. After carbon dioxide evolution was complete, the mixture was titrated to determine the presence of free acid and the additional amount of diisocyanate calculated to neutraloze the free acid was added. The solution was cooled, dissolved in dimethylformamide and precipitated by pouring into methanol. The copolyamideimide was removed by filtration and dried in a vacuum oven.

The compositional details and properties of the products of Examples 7-9 are given in Table II. Intrinsic viscosities were determined in dimethylformamide at 25° C.

TABLE II

| Example | 7 | 8 | 9 |
|---|---|---|---|
| Reagent F acid | Adipic | Isophthalic | Isophthalic |
| Molar ratio, F:D | 1:1 | 1:1 | 0.5:1 |
| Intrinsic viscosity, dl./g. | 0.28 | 0.31 | 0.24 |
| Tg, °C. | 228 | 254 | 255 |

The acid-extended copolyamideimides of this invention may be converted into films for wrapping and packaging applications and into molding compounds. They are also useful for application in solution to electrical conductors made of copper, aluminum or the like, particularly wires, as insulating coatings. If desired, additional overcoats of polyamides, polyesters, silicones, polyvinylformals, epoxy resins, polyimides, polytetrafluoroethylene or the like may be further applied to such insulated conductors.

What is claimed is:

1. A method for preparing an acid-extended copolyamideimide which comprises the steps of:
   (1) reacting, under conditions whereby all water of reaction is removed:
   (A) at least one diamine having the formula $$H_2N-R^1-NH_2, \quad (I)$$

wherein $R^1$ is a divalent aromatic hydrocarbon radical containing about 6-20 carbon atoms or halogenated derivative thereof, alkylene or cycloalkylene radical containing about 2-20 carbon atoms, or bis-alkylenepoly(dialkylsiloxane) radical; with
   (B) at least one carboxy anhydride of the formula

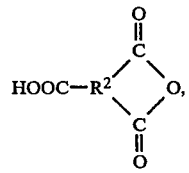

(II)

wherein $R^2$ is a trivalent aliphatic radical containing about 2-20 carbon atoms or aromatic radical containing about 6-20 carbon atoms, and
   (C) at least one dianhydride of the formula

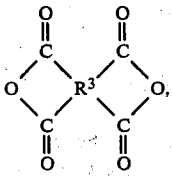

(III)

wherein $R^3$ is a tetravalent aliphatic radical containing about 2-20 carbon atoms or aromatic radical containing about 6-20 carbon atoms;
   the molar ratio of reagent C to reagent B being at least about 0.25:1 and the ratio of equivalents of reagent A to anhydride equivalents of reagents B and C combined being about 1:1; and subsequently
   (2) reacting, at a temperature within the range of about 150°-225° C., a mixture of
   (D) the product of step 1, or a functional derivative thereof, and
   (F) at least one dicarboxylic acid having the formula $$HOOC-R^7-COOH, \quad (IV)$$

wherein $R^7$ is a divalent alkylene or aromatic hydrocarbon radical containing about 3-12 carbon atoms, or a functional derivative thereof; the molar ratio of reagent F to reagent D being about 0.1-2:1; with
   (E) at least one compound selected from the group consisting of diisocyanates having the formula $$OCN-R^4-NCO \quad (IV)$$

and diamines having the formula $$R^5NH-R^4-NHR^6, \quad (V)$$

wherein
   $R^4$ is a divalent polymeric radical, aromatic hydrocarbon radical containing about 6-20 carbon atoms or halogenated derivative thereof, alkylene or cycloalkylene radical containing about 2-20 carbon atoms, or bis-alkylenepoly(dialkylsiloxane) radical; and
   each of $R^5$ and $R^6$ is independently hydrogen or a lower hydrocarbon radical.

2. A method according to claim 1 wherein reagent D is said prepolymer, reagent F is said dicarboxylic acid and reagent E is at least one diisocyanate.

3. A method according to claim 2 wherein each of $R^2$ and $R^3$ is an aromatic radical and the ratio of equivalents of reagents D and F combined to reagent E is from about 0.67:1 to about 1.5:1.

4. A method according to claim 3 wherein $R^7$ is an alkylene radical containing 3-6 carbon atoms or an aromatic hydrocarbon radical.

5. A method according to claim 4 wherein the molar ratio of reagent C to reagent B is at least about 0.5:1 and the molar ratio of reagent F to reagent E is up to about 1.5:1.

6. A method according to claim 5 wherein each of $R^1$ and $R^4$ is an aromatic hydrocarbon radical, $R^2$ is

and R³ is 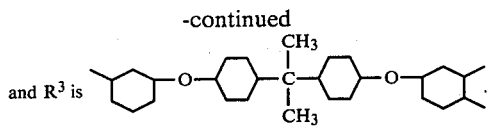

7. A method according to claim 6 wherein R⁷ is at least one of the m- and p-phenylene radicals.

8. A method according to claim 7 wherein reagent A is m-phenylenediamine, m-toluenediamine or 4,4-diaminodiphenylmethane and reagent E is at least one compound selected from the group consisting of 2,4-toluene diisocyanate, 2,6-toluene diisocyanate and 4,4'-methylenebis(phenyl isocyanate).

9. An acid-extended copolyamideimide prepared by the method of claim 1.

10. An acid-extended copolyamideimide prepared by the method of claim 3.

11. An acid-extended copolyamideimide prepared by the method of claim 4.

12. An acid-extended copolyamideimide prepared by the method of claim 7.

13. An acid-extended copolyamideimide consisting essentially of units having the formulas

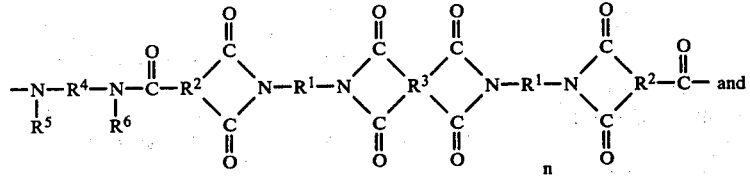 (X)

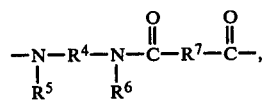, wherein:
each of R¹ and R⁴ is independently a divalent aromatic hydrocarbon radical contaning about 6-20 carbon atoms or halogenated derivative thereof, alkylene or cycloalkylene radical containing about 2-20 carbon atoms, or bis-alkylenepoly(dialkyl-siloxane) radical;
R² is a trivalent aliphatic radical containing about 2-20 carbon atoms or aromatic radical containing about 6-20 carbon atoms;
R³ is a tetravalent aliphatic radical containing about 2-20 carbon atoms or aromatic radical containing about 6-20 carbon atoms;
each of R⁵ and R⁶ is independently hydrogen or a hydrocarbon radical;

R⁷ is a divalent alkylene or aromatic hydrocarbon radical containing about 3-12 carbon atoms, and the average value of n is at least 0.5;
the ratio of units of formula XI to those of formula X being up to about 2:1.

14. A copolyamideimide according to claim 13 wherein each of R² and R³ is an aromatic hydrocarbon radical and each of R⁵ and R⁶ is hydrogen.

15. A copolyamideimide according to claim 14 wherein R⁷ is an alkylene radical containing 3-6 carbon atoms or an aromatic hydrocarbon radical.

16. A copolyamideimide according to claim 15 wherein the average value of n is at least 1 and the ratio of units of formula XI to those of formula X is from about 0.67:1 to about 0.5:1.

17. A copolyamideimide according to claim 16 wherein each of R¹ and R⁴ is an aromatic hydrocarbon radical, R² is

(XI)

R³ is 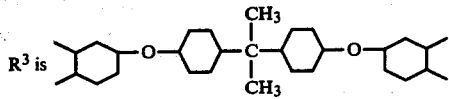

and the average value of n is at least 1.

18. A copolyamide according to claim 17 wherein R⁷ is at least one of the m- and p-phenylene radicals.

19. A copolyamideimide according to claim 18 wherein R¹ is

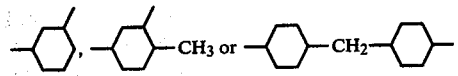

and R⁴ is at least one of the 2,4-tolylene, 2,6-tolylene and 4,4'-methylenebis-phenyl radicals.

* * * * *

UNITED STATES PATENT AND TRADEMARK OFFICE
CERTIFICATE OF CORRECTION

PATENT NO.   :   4,481,339
DATED        :   November 6, 1984
INVENTOR(S)  :   Donald A. Bolon It is certified that error appears in the above-identified patent and that said Letters Patent are hereby corrected as shown below:

```
Col. 3, line 52
Col. 4, line 10 + formulas VII, VIII, IX
Claim 6
Claim 17, and
Claim 19
```

All formulas should be aromatic i.e., 

Signed and Sealed this

Seventeenth Day of December 1985

[SEAL]

Attest:

DONALD J. QUIGG

*Attesting Officer*    *Commissioner of Patents and Trademarks*